United States Patent [19]

Advani et al.

[11] Patent Number: 4,974,151
[45] Date of Patent: Nov. 27, 1990

[54] CONFIGURATION CAPABILITY FOR DEVICES IN AN OPEN SYSTEM HAVING THE CAPABILITY OF ADDING OR CHANGING DEVICES BY USER COMMANDS

[75] Inventors: Hira Advani; William L. Terrell, both of Austin, Tex.

[73] Assignee: International Business Machines Corporation, Armonk, N.Y.

[21] Appl. No.: 132,673

[22] Filed: Dec. 11, 1987

Related U.S. Application Data

[63] Continuation of Ser. No. 704,036, Feb. 21, 1985, abandoned.

[51] Int. Cl.$^5$ .................... G06F 3/14; G06F 13/10
[52] U.S. Cl. ........................ 364/200; 364/237.2; 364/280.2
[58] Field of Search ... 364/200 MS File, 900 MS File, 364/300

[56] References Cited

U.S. PATENT DOCUMENTS

| | | | |
|---|---|---|---|
| 4,245,308 | 1/1981 | Hirschman et al. | 364/200 |
| 4,326,263 | 4/1982 | Given | 364/300 |
| 4,403,303 | 9/1983 | Howes et al. | 364/900 |
| 4,475,156 | 10/1984 | Federico et al. | 364/200 |
| 4,559,614 | 12/1985 | Peek | 364/900 |
| 4,562,535 | 12/1985 | Vincent et al. | 364/200 |
| 4,564,903 | 1/1986 | Guyette et al. | 364/200 |
| 4,570,217 | 2/1986 | Allen et al. | 364/900 |
| 4,604,690 | 9/1985 | Crabtree et al. | 364/200 |
| 4,631,666 | 12/1986 | Harris et al. | 364/200 |

Primary Examiner—Lawrence E. Anderson
Attorney, Agent, or Firm—Whitham & Marhoefer

[57] ABSTRACT

A screen-oriented process is used for configuring devices in an open computer system. The computer system includes an operating system having device drivers, and the operating system can be run as a virtual machine on a virtual resource manager wherein a procedure is used to bind the device drivers of the operating system and the virtual resource manager and an attached device on a particular port of an adapter using device dependent information. The configuring process initially requires the creation of device dependent information files for a plurality of devices and device types, and these files are installed in the computer system. Each file includes adpater specific information and device specific information consolidated in a single file. The user may invoke a configuration command, and the system responds by displaying a plurality of commands such as add, change, delete and show and prompts the user to choose a command. If the add command is chosen, the system displays a list of predefined devices and adapters of the device type specified by the user and prompts the user to choose from among the predefined devices and adapters in the list. When the user makes a choice, the system then asks the user whether the device dependent information for the chosen device and adapter should be displayed so that the user has the option of changing either or both the adapter specific information and the device specific information in one step. Similarly, if the change command is chosen, the information for the previously installed device specified by the user is displayed so that the user has the option of changing either or both the adapter specific information and the device specific information in one step.

1 Claim, 1 Drawing Sheet

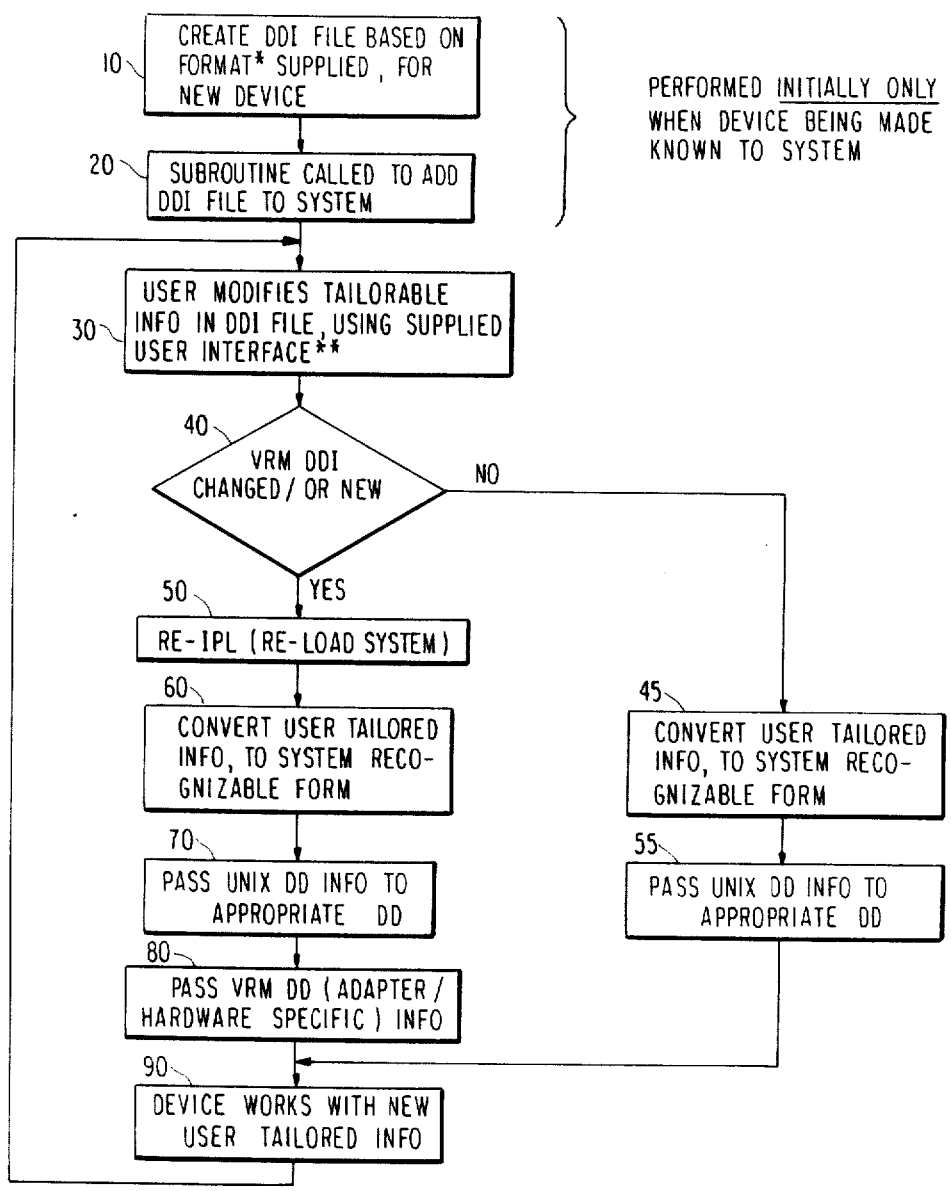
LEGEND: VRM DD = VIRTUAL RESOURCE MANAGER DEVICE DRIVER
DDI = DEVICE DEPENDENT INFORMATION
IPL = INITIAL PROGRAM LOAD
\* SAMPLE FORMAT OF DDI FILE ATTACHED
\*\* EXAMPLE OF USER INTERFACE (e.g. DIALOGING WITH SYSTEM) ATTACHED TO DISCLOSURES

CONFIGURATION CAPABILITY FOR DEVICES IN AN OPEN SYSTEM HAVING THE CAPABILITY OF ADDING OR CHANGING DEVICES BY USER COMMANDS

This application is a continuation of copending application Ser. No. 06/704,036, filed Feb. 21, 1985, now abandoned.

CROSS-REFERENCE TO RELATED APPLICATIONS

This application discloses an invention which is related in subject matter to the invention disclosed in the following copending patent application filed concurrently herewith and assigned to a common assignee herewith:

"Modification of Device Configuration by User", by Hira Advani and William Lee Terrell, Ser. No. 07/132,672 filed concurrently herewith on Dec. 11, 1987, as a continuation of application Ser. No. 06/703,922, filed Feb. 21, 1984.

The disclosure of the foregoing application is incorporated herein by reference.

BACKGROUND OF THE INVENTION

The subject invention is directed to an easy-to-use strategy for managing device dependent information in an open computer system to facilitate configuration of the system by the user. By an open computer system, what is meant is a computer system in which peripheral devices may be added to or deleted from the computer system at any time. Besides adding or deleting devices, the invention allows the modification of device dependent information in such a way that the user always preceives the device dependent information as a single entity even though it comprises adapter specific information and device specific information.

Personal computers have come into wide spread use by a variety of people and have generally been credited with creating a revolution in the computer industry. A characteristic of these computers is their "open" design allowing the basic computer system to be configured to the special needs of the end user. A wide variety of peripheral devices and device adapters are available from both computer manufacturers and third part vendors. The trend is for the end user to separately purchase the basic computer system, the peripheral devices s/he needs for a specific application or applications, and the device adapters required to support the peripheral devices and assemble the various components into an operative computer system. This process involves more than merely plugging adapter cards into the system bus and cabling the various components together; it is also necessary to tell the computer, or rather its operating system, what devices are in the system. This process is referred to as "installing" the devices and requires specifying the device parameters or, as used in this application, the device dependent information (DDI). This task can be quite complicated and normally should not be undertaken by any but experienced technicians. Typically, software applications for personal computers include a simple installation procedure which merely gives the user a choice of a limited selection of, for example, printers for which the parameters have been stored in the operating system. The installation process is confined to the selection of one of the listed printers, and there is typically no easy way to add or modify the device dependent information. Therefore, if the device which the user desires to install in his or her system is not listed in the application program, there is no easy way even for a relatively sophisticated user to input the required device dependent information to the operating system so as to support a specific device.

Application Ser. No. 06/703,922 for "Modification of Device Configuration by User" by the applicants herein describes a procedure wherein an "ADDDEV" command is provided which may be invoked by the user to specify an action on a device such as add, delete or modify. Once the action is selected by the user, the system prompts the user to enter the name of a default or similar device already installed in the system. The system stores the parameters of both default devices and devices already installed in the system. When the user enters the name of a default or similar device to be added, for example, the system determines, from the stored parameters for the default or similar device, only those parameters which must be specified by the user for the device to be added. The remaining parameters are propagated for the similar device from the settings of the default device. The user is then prompted to enter only those parameters requiring specification, and once those parameters have been entered, the entered parameters and those common to both the default or similar device named by the user and the added device are stored. Once these parameters are stored, the installation of the added device has been completed. A similar process permits modification of device parameters for devices which have been previously installed to allow for those situations where a previously installed device has been modified to provide other or additional features.

SUMMARY OF THE INVENTION

It is therefore an object of the present invention to provide an easy-to-use strategy for managing device dependent information when adding or deleting devices in an open computer system or modifying device dependent information in such a way that the user always preceives the device dependent information as a single entity even though it comprises an adapter specific portion and a device specific portion.

It is another object of this invention to provide a screen oriented procedure to facilitate user configuration of a computer system.

It is a further object of the invention to provide a technique which enables a user of an "open" computer system to add new device configurations for additional devices.

According to the invention, there is initially created a plurality of device dependent information files for a plurality of devices and device types. Each file includes adapter specific information and device specific information consolidated in a single file as a single entity. The user may invoke a configuration command which causes the user to be prompted to enter one of a plurality of commands such as add, delete or change. If the change command is entered, the user is prompted to enter the name of the device for which device dependent information is to be changed. The system then displays the device dependent file for the device named by the user so that the user has the option of modifying either or both the adpater specific information and the device specific information in one step. The modified device dependent information is then passed to the appropriate device driver of the operating system. In the case where the operating system is run as a virtual machine on a virtual resource manager, a determination is made after the user modifies the device dependent information as to whether any virtual resource manager device driver information has been changed. If so, the modified device dependent information is passed to the appropriate device driver of the operating system as before and then the adapter and device specific information is passed to the virtual resource manager device driver. The procedure for adding a device is simplified for the user by displaying a set of device names for which device dependent information, including both adapter specific information and device dependent information, have been previously stored. The user may simply select the device name for the device to be installed. The procedure is, however, more flexible than prior procedures in that after naming the device from the displayed set of device names, the user is given the option of displaying and/or changing the device dependent information stored for the named device.

BRIEF DESCRIPTION OF THE DRAWING

The foregoing and other objects, aspects and advantages of the invention will be better understood from the following detailed description of the invention with reference to the accompanying drawing in which the sole FIGURE is a flow diagram of the configuration process according to the present invention.

DETAILED DESCRIPTION OF THE INVENTION

Referring now to the drawing, the first step in the configuration procedure is to create device dependent information (DDI) files for a plurality of devices. These DDI files contain both adapter specific information and device dependent information for each device as a specific entity as indicated in block 10 of the FIGURE. In other words, certain "canned" device configurations are created. For example, LPT6 might be defined as a printer on a parallel port adapter, LPT8 might be defined as a printer on a serial port adapter, and so on. The DDI files for each such device configuration includes such hardware characteristics as device type, port address, DMA (direct memory access) support, interrupt support, RAS (reliability, availability, and serviceability) log information, device characteristics, application parameters, and the like. A typical example of a printer file is set forth below:

Device Type

[IBS]:I/O Bus device flag=
[SWT]:Switchable flag=
[WID]:Device width=
[QPT]:# of queued print jobs=
[ITR]:# of interrupts=
[SLN]:Slot number=
[PTN]:Port number=
[PA]:Port address=
[NP]:# of I/O ports=
[BMS]:Bus memory addr start=
[BME]:Bus memory addr end=

Dma Support

[DMS]:DMA support flag=
[FPD]:First party DMA flag=
[IOB]:IOCC buffering flag=
[RGM]:Region mode flag=
[DMO]:Only use DMA flag=
[CPC]:Co-processor channel flag=
[CHN]:Channel #=

Interrupt Support

[INS]:Device supports interrupts flag=
[SHI]:Shared interrupt flag=
[PEI]:Poll with every interrupt flag=
[INP]:Interrupt priority=
[INL]:Interrupt level=
[ISP]:Interrupt status, port-addr=
[ISA]:Interrupt status, AND mask=
[ISE]:Interrupt status, EXOR mask=

Ras Log

[RSL]:Length of RAS log=
[BRD]:Bytes read=
[BWR]. :Bytes written=
[ERN]:Number of errors=
[PEN]:Number of permanent errors=

Device Characteristics

[CL]:Character length=
[NSB]:Number of stop bits=
[PRC]:Parity checking=
[OPM]:Operation mode=
[RPT]:Requested protocol=
[FEI]:Framing error interrupt=
[PEI]:Parity error interrupt=
[XNF]:Include XON/XOFF=
[TON]:Transmit XON value=
[TOF]:Transmit XOFF value=
[FES]:Framing error substitute value=
[PES]:Parity error substiture value=
[RON]:Receive XON value=
[ROF]:Receive XOFF value=
[RTH]:Receive XON (full) threshold value=
[RTH]:Receive XOFF (empty) thershold value=
[AT]:Adapter type=
[BR]:Baud rate=
[FRQ]:Frequency input=
[BC]:Bits/character=

Application Parameters

[LM]:Left margin=
[RM]:Right margin=
[LP]:Lines per page=
[BS]:Backspace to printer=
[CR]:Carriage returns=
[FF]:Forms feed=
[LF]:Line feeds=
[ET]:Expand tabs=
[UC]:Upper case only=
[LO]:Line overflow=
[TO]. :Translate options=
[PH]:Paper handling=
[PS]:Paper size=
[DS]:Dip switches=
[BC]:Bits/character=
[ETV]:Error timeout value=
[ERT]:Error retry count When a device dependent information file has been created for a particular device configuration, a subroutine is called to add the device dependent information to the system as indicated by block 20 in the FIGURE. This process is repeated until all the desired device configurations have been added to the system. The procedures represented by blocks 10 and 20 are performed only once when a device configuration is being made known to the system and are typically performed by the manufacturer of the operating system. Thus, the operating system is provided with certain "canned" device configurations from which a user may choose in configuring the computer system.

Consider first the situation where the user desires to add a device to his or her computer system. There are several possibilities available to the user. The user may add a predefined device with no parameter modifications; the user may add a predefined device with parameter modifications to customize the device; or the user may add a "similar" device to one already installed in the system. The last possibility is the subject of application Ser. No. 06/703,922 filed by the applicants hereof for "Modification of Device Configuration by User" and incorporated herein by reference. For the purposes of the present description, suppose the user wants to add a device. S/he would invoke a configuration command, here denoted "ADDDEV". In response to this command, the system would prompt the user with the screen below showing a list of available commands:

| ADDDEV command available are: | |
|---|---|
| add | (add a device) |
| change | (change device information) |
| delete | (delete a device) |
| show | (display device information) |
| Press help key for help on how to use ADDDEV or press help key after typing a command to get help on that command. | |
| Press DO to exit ADDDEV. | |
| Enter one of the above commands. | |
| > a | |

In the above screen, the user has typed an "a" at the ">" prompt meaning that the user desires to add a device. The user could have typed out the word "add" instead of simply typing the letter "a". In either case, the system will then display a list of device types such as diskette, tape, printer, plotter, display, and the like and prompt the user to enter one of the device types. For this example, it will be assumed that the user wishes to add a printer and therefore would type in that device type. Alternatively, the user could have simply typed the device type with the add command as for example "a printer" or "add printer". When the device type has been specified, the system then displays a list of predefined devices of that device type and prompts the user to select one as in the screen below:

| The following devices are available: | |
|---|---|
| LP1 | 5152 printer/aaaa adapter |
| LP2 | 51xx printer/bbbb adapter |
| LP3 | 51yy printer/cccc adapter |
| LP4 | 51zz printer/dddd adapter |
| Enter one of the above names. | |
| > LP2 | |

In the above screen, the user has selected printer LP2 by entering that name at the ">" prompt. The system responds with a message indicating that all parameter information is predefined and asks the user if the parameters or settings should be displayed. In the example shown in the screen below, the user does not want to display or change settings:

| All settings for this device have been predefined for |
|---|

| -continued |
|---|
| you. Do you wish to display or change these settings |
| Y - yes |
| N - no |
| Enter one of the above choices. |
| > n |

The user is then prompted to verify that the printer is to be added. If a re-IPL (initial program load) is required because of adding or changing the device, a warning message is displayed to indicate that IPL will take place at the end of the ADDDEV session when the DO key is pressed to exit ADDDEV. For the time being, it will be assumed that IPL is not required. When the user verifies that the printer is to be added, the system responds with a completion message and, after the user presses ENTER, the list of available subcommands, i.e. add, change, delete, etc., is again displayed. Thus, the user can continue the ADDDEV session until all device configurations have been specified. From the foregoing, it will be appreciated that a simple and easy-to-use procedure has been provided for adding devices which have been predefined in the system. However, according to the invention, the user is not confined to the predefined device dependent information and may change it at the time a device is added to the system to customize the device or at a later time as in the case where a previously installed device has been modified to provide added features not in the predefined device dependent information.

Consider the situation where the user desires to change the device dependent information for a printer LP4 which was previously installed in the system. To do this, the user would input in the ADDDEV screen the command "c printer LP4" meaning that s/he desires to change the parameter settings for printer LP4. Again, the user could have entered only the command "c" or "change" in which case the system would prompt the user to input the device name. In any event, when the device has been named, the system displays the list of parameters for that device and prompts the user to enter any changes as in the screen below:

| Name: LP4 | | | |
|---|---|---|---|
| Description | Name | Current Setting | Allowed Settings |
| left margin col. | lmc | 15 | 1-79 |
| right margin col. | rmc | 60 | 1-80 |
| top margin skip | tms | 3 | 1-60 |
| bottom margin skip | bms | 60 | 1-60 |
| page length | pgl | 60 | 1-60 |
| . | . | . | . |
| . | . | . | . |
| . | . | . | . |
| Enter setting name and new value (for example: lmc 8) and press ENTER or just press ENTER to continue display of settings. | | | |
| > lmc 10 | | | |

In the screen above, the user has changed the parameter setting for the left margin column from 15 to 10. Each time the user enters a parameter from the list of parameters on the screen, the screen is refreshed with the same set of parameters displayed so as not to scroll any of the parameter information off the screen. The next set of parameters is not displayed until the user presses the ENTER key to indicate that the current screen information is no longer needed and the display of the remaining parameters can continue. Then, when the user has completed the changes, s/he presses the DO key to end the changes. The system then prompts the user to verify that the user wants to commit the changes, and when the user verifies that the changes are to be committed, the system displays a message that, in this example, the printer LP4 has been changed. It will, of course, be understood that the procedure for changing device dependent information for a previously installed device is in every way similar to changing the information of a predefined device during the add procedure described above in order to customize an added device.

Whether the device dependent information for a device previously installed is changed or the device dependent information for a device which is being added is changed, the changed information is entered into the system as indicated by block 30 of the drawing FIGURE. In the simplest case, the user tailored information which has been entered is converted to system recognizable form in block 45 and the device dependent information is passed to the appropriate device driver in block 55. This completes the process of changing the device dependent information so that the device in question works with the user tailored information as indicated in block 90. The process then returns to wait for a future change command from the user.

The subject invention may be used in the environment of an operating system, such as the UNIX (TM of AT&T) operating system, operating as a virtual machine (VM) on a virtual resource manager (VRM). In such an environment, a "token" (Input/Output Device Number or IODN) corresponding to the device is placed in the UNIX device driver. At the program initiation time, this token is used to define to the VRM the device, with adapter dependent information which includes a hardware port address for the physical device. A special file corresponding to the device is created. When this special file is opened, the UNIX device driver retrieves the token for the device and "attaches" to the VRM. This causes the VRM device driver to use the adpater dependent information corresponding to the token and placed in the process stack. Thus, when the UNIX device driver is "opened" to drive a device, it uses this token passed to it to communicate with the VRM device driver thereby accomplishing driver to driver binding. Additional information on virtual machines may be had with reference to Deitel, Harvey M., *An Introduction to Operating Systems*, Addison-Wesley (1984), Chapter 21, "MVS", and Lorin, Harold, and Harvey M. Deitel, *Operating Systems*, Addison-Wesley (1981), Chapter 16, "Virtual Machines".

In this environment, after the user changes the device dependent information in block 30 in the drawing FIGURE, it is necessary to make a decision in block 40 as to whether VRM device dependent information has been changed as opposed to UNIX device dependent information, for example. If not, the process proceeds as described to block 45. Otherwise, the process proceeds to block 50 wherein the system is reloaded, i.e., re-IPL. Then, in block 60, during the IPL process, the user tailored information is converted to system recognizable form, and in block 70, the UNIX device driver information is passed to the appropriate device driver. In block 80, the VRM device driver information, which is adapter and hardware specific, is passed to complete the binding operation. At this point, the device now works with the new user device dependent information as indicated by block 90, and the process returns as before.

Thus, the invention provides not only a simple and easy-to-use procedure for adding a device to an open computer system, but also provides an easy-to-use strategy for managing device dependent information for customizing or changing device parameters. A particular feature of the invention is the fact that the user always perceives device dependent information as a single entity, even though it comprises the adapter specific portion and the device specific portion. The user then has the option of modifying either or both adapter and device specific information in one step thereby greatly simplifying the process.

We claim:

1. A screen-oriented process for configuring devices in an open computer system including an operating system having device drivers, each device which may be installed in the system being connected to a bus in the computer system by an adapter, wherein said operating system is run as a virtual machine on a virtual resource manager and the operating system has devices in the virtual resource manager, said process including the steps of after the user has changed either or both the adapter specific information or the device specific information, initially creating device dependent information files for a plurality of devices and device types which may be installed in said computer system, each file including adapter specific information and device specific information consolidated in a single file, installing said files into said computer system, responding to a user initiated configuration command by prompting the user to enter one of a plurality of commands including an add device command and change device command, responding to the changer device command by displaying the device dependent information file for the device specified by the user so that the user has the option of changing either or both the adaptor specific information and the device specific information in one step, passing the device dependent information as changed by the user to the appropriate device driver of said operating system, responding to the add device command by displaying a list of predefined devices and adapters of the device type specified by the user and prompting the user to choose one of the predefined devices and adapters in the list, after the user has chosen one of the predefined devices and adapters from the list, asking the user if the device dependent information for the chosen predefined device and adapter is to be displayed, and if so, displaying the predefined device dependent information file for the chosen predefined device and adapter so that the user has the option of modifying either or both the adapter specific information and the device specific information in one step, passing the device dependent information to the appropriate device driver of said operating system, determining whether the virtual resource manager device dependent information has been changed, and if so, p1 passing the operating system device driver information to the appropriate device driver, and passing the virtual resource manager device driver information to bind the operating system device driver and the virtual resource manager device driver using the device dependent information.

* * * * *

UNITED STATES PATENT AND TRADEMARK OFFICE
CERTIFICATE OF CORRECTION

PATENT NO. : 4,974,151

DATED : November 27, 1990

INVENTOR(S) : H. Advani and W. L. Terrell

It is certified that error appears in the above-identified patent and that said Letters Patent is hereby corrected as shown below:

```
Col. 8, line 19, after "has", please insert --device drivers bound
to device drivers or real and virtual--.
        line 34, please delete "changer" and insert --change--;
and
        line 61, please delete "p1".
```

Signed and Sealed this

Twentieth Day of July, 1993

Attest:

MICHAEL K. KIRK

Attesting Officer

Acting Commissioner of Patents and Trademarks